(No Model.) 3 Sheets—Sheet 1.
G. H. THOMSON.
DRAWBRIDGE.
No. 496,074. Patented Apr. 25, 1893.
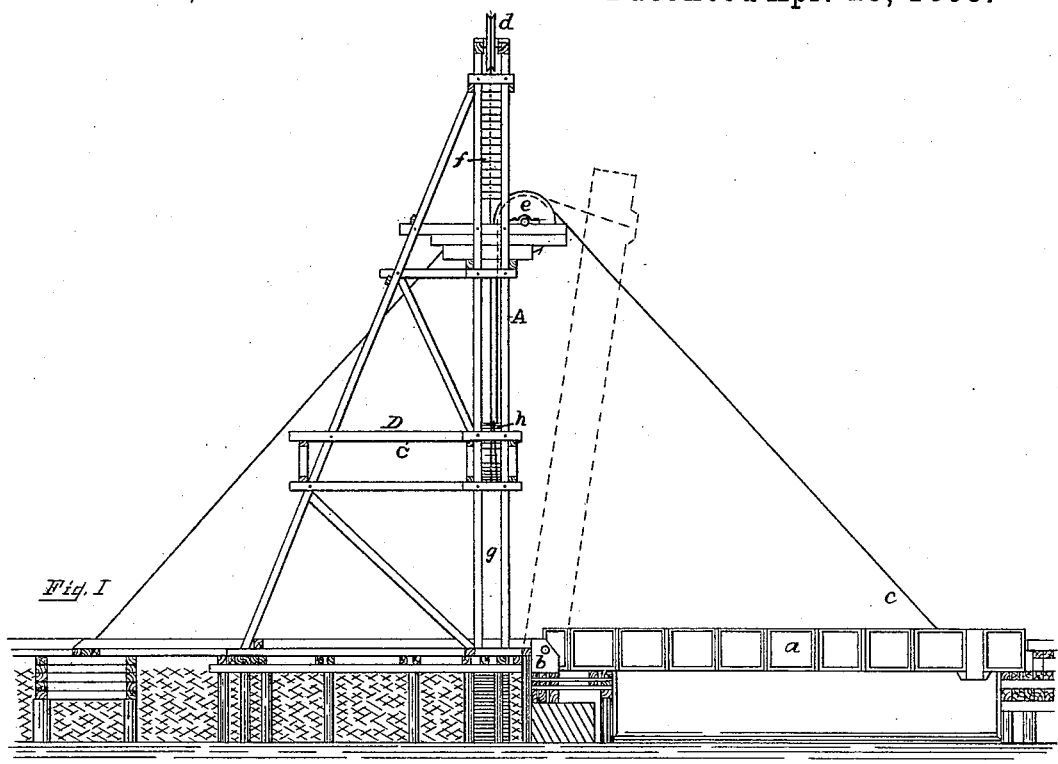
Fig. I
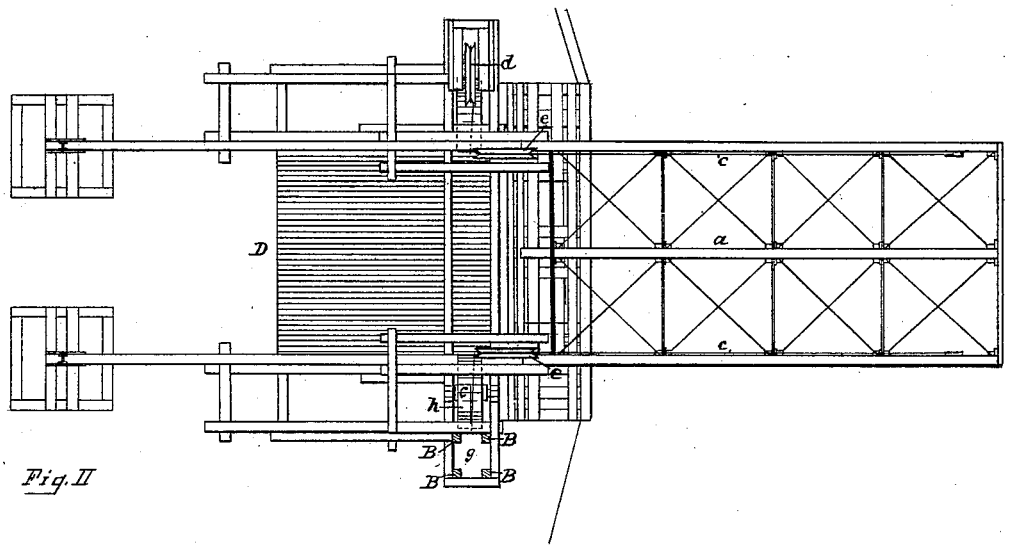
Fig. II
WITNESSES:
INVENTOR
George H. Thomson
BY
H. Anderson
ATTORNEY.

(No Model.) 3 Sheets—Sheet 2.
G. H. THOMSON.
DRAWBRIDGE.
No. 496,074. Patented Apr. 25, 1893.
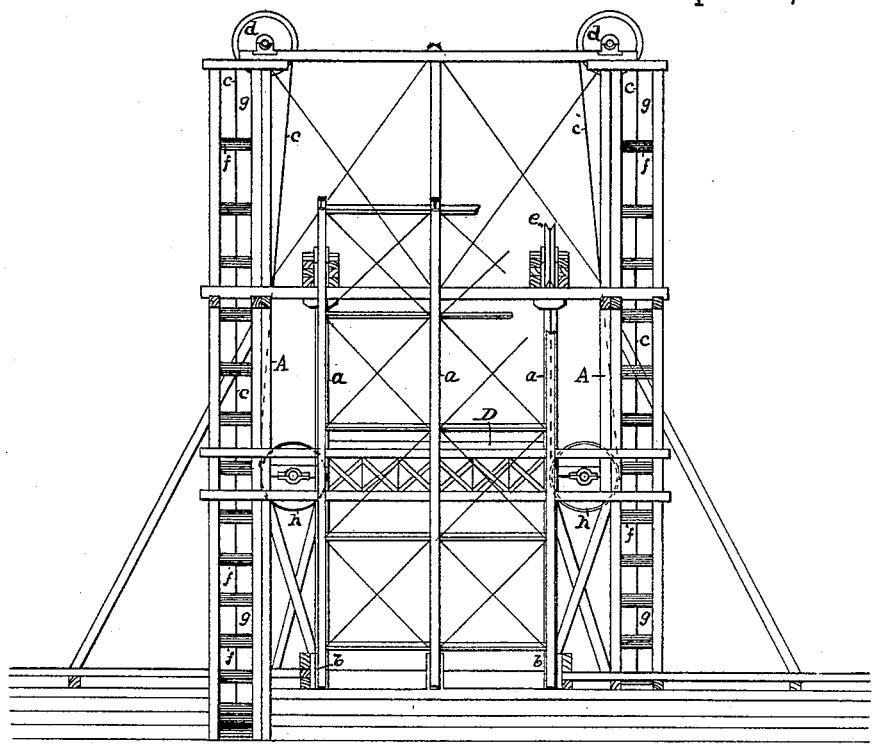
Fig. III
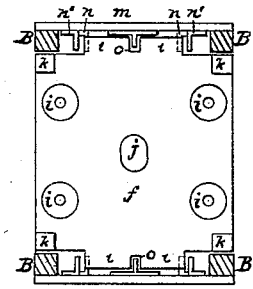
Fig. IV
Fig. V
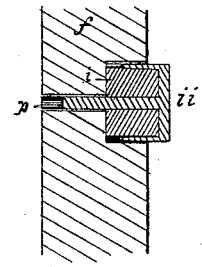
Fig. VI
Fig. VII
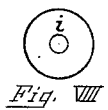
Fig. VIII
WITNESSES
*[signatures]*
H. Alban Anderson.
INVENTOR
George H. Thomson
BY
H. Anderson
ATTORNEY.

(No Model.)
G. H. THOMSON.
DRAWBRIDGE.
No. 496,074. Patented Apr. 25, 1893.
3 Sheets—Sheet 3.
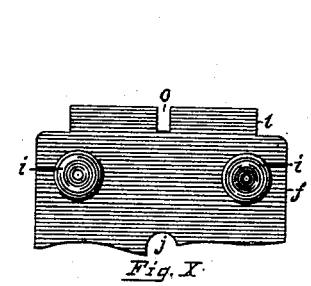
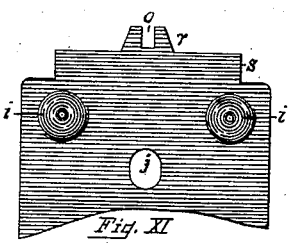
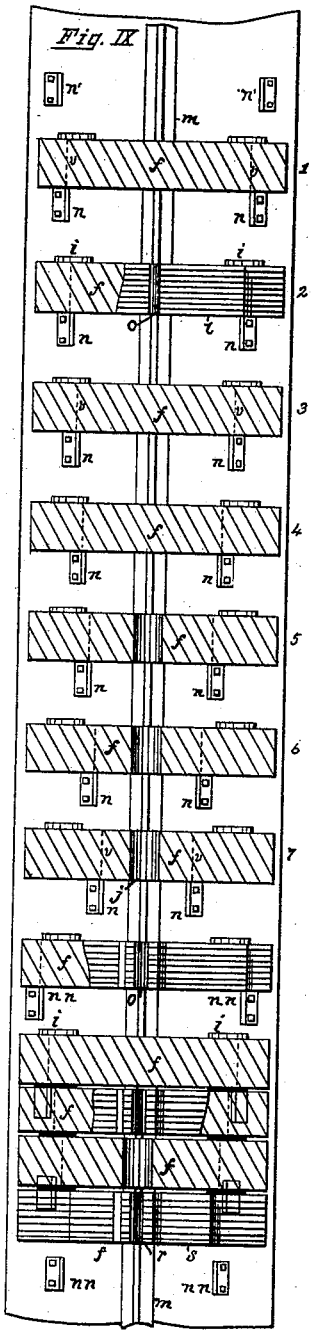
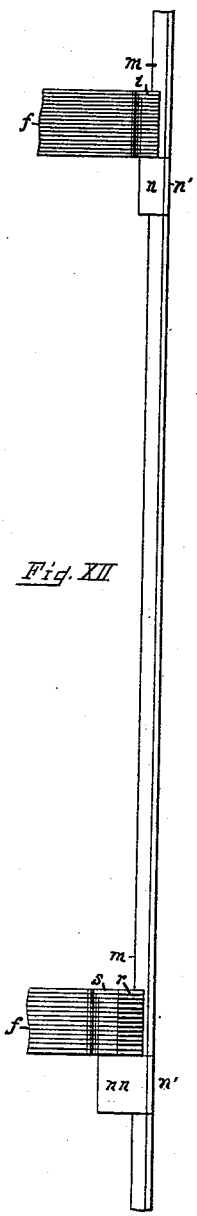
WITNESSES
INVENTOR George H. Thomson
BY
ATTORNEY.

UNITED STATES PATENT OFFICE.

GEORGE H. THOMSON, OF SING SING, NEW YORK.

DRAWBRIDGE.

SPECIFICATION forming part of Letters Patent No. 496,074, dated April 25, 1893.

Application filed March 11, 1892. Serial No. 424,595. (No model.)

*To all whom it may concern:*

Be it known that I, GEORGE H. THOMSON, a citizen of the United States, and a resident of Sing Sing, in the county of Westchester and State of New York, have invented certain new and useful Improvements in Drawbridges, of which the following is a specification.

My invention relates to that class of draw bridges styled "end lift" bridges, and its object is to reduce to a minimum the power required to manipulate them.

The object is attained by the means set forth in the accompanying drawings.

Figure I is a representation of an end lift bridge supplied with counterweight attachments. Fig. II is a plan of the same. Fig. III is an end elevation, showing the bridge in a lifted position. Fig. IV is a plan view of counterweights as employed in my invention. Fig. V is an edge view of the counterweight. Figs. VI, VII and VIII represent details of cushioning devices. Fig. IX is a representation of the manner in which the counterweights are suspended. Figs. X and XI are half sections of counterweights, and the manner in which they are respectively suspended and guided is shown in Fig. XII.

The bridge $a$ Figs. I and II is shown to be pivoted at $b$ and at or near its free end has attached to it flexible members $c$ which may be wire ropes, cables or chains. These members pass to and over sheaves $e$ that are mounted in tower A as shown, and from the sheaves they pass to, and one or more times around drums $h$, $h$, thence upward and over the sheaves $d$ on the tops of the tower. The sheaves $d$ are so placed that as the members $c$ pass over them they fall centrally within a well $g$ (shown in cross section in Fig. II.) adapted to receive the counterweights attached to the members hanging therein.

Upon the girders C a platform D, Fig. II, is erected and supports an engine or other motive power for operating the drums $h$.

Reference to the several Figs. I, II and III will make clear the path of the member $c$ in its passage from the ends of the bridge to the counterweights. It will be obvious that when the bridge is down, by revolving the drums in a direction to wind up the members $c$, the weights $f$ will fall and the bridge will rise, to the position shown in Fig. III and also by the broken lines in Fig. I. In the former figure one corner of the bridge is broken away to show the relative position of the sheave $e$. It will also be plain that if the series of weights shown at $f$ Fig. I be considered as one weight that nearly counter-balances the bridge when it nears the vertical position, it will fall far short of being a counterbalance when the bridge nears the horizontal position, and consequently the power required to manipulate the bridge will be a constantly varying one throughout the entire lift, gradually diminishing after the lift begins and vice versa. In order to overcome this difficulty and not only equalize the power required but also to reduce it to a minimum, I divide the counterweight into parts and so arrange them that as the bridge rises and the weights fall they are caught one by one, beginning with the top weight, then the second weight and *en suite* by stops in the framing, and the weights thus stopped no longer exert a pull on the members $c$, as indicated in Fig. III; and I so arrange the weights as to number and quantity of weight, and the stops by spacings, that the action of gravity due from the weights nearly balances the weight of the bridge in all its various positions from horizontal to vertical. The work of raising and lowering the bridge is principally done *ab intra*, while the application of power *ab extra* is required to make the principle successful.

Referring to Fig. IV, B, B, B, B, represent in cross-section the leaders of a tower, and $f$ represents the plan of a weight adapted to move up and down in the space inclosed by the leaders. The wire lifting member passes through a hole $j$ in the center of the weights, the rope being fast only to the last or bottom weight. $m$, $m$, represent guides secured to the framing, the projecting tongues or flanges entering the notches $o$, $o$, in the ends of the weights. $n'$, $n'$, and $n$, $n$, represent flange plates also secured to the framing and serving as catches for the weights. The weight is represented as resting on the flanges $n$, $n$, the width of the projections $t$, $t$, being adapted to these flanges. The next weight above the one shown would have a width of projection ($t$, $t$,) adapted to be caught on the flanges $n'$, $n'$, and so throughout the series each weight is adapted to its proper catches, excepting the bottom weight which is held by the end of the wire, rope or cable. *i, i*, represent rubber or other elastic cushioning springs to prevent a shock arising from the contact of the weights when coming together in lifting. *k, k*, are corner projections to facilitate the leveling of the weights one upon the other.

Fig. V is an edge view of the weight shown. In Fig. VI a particular form of spring is shown. A metallic cap *i i*, fitting over the rubber *i*, has a stem passing through the rubber and loosely in a hole *p* through the block *f*, as shown. This affords protection to the rubber, and also insures greater elasticity of the rubber. Fig. VII is another view of the cap *i i*, and Fig. VIII is a plan of the rubber spring.

Figure IX is a clear representation of the method employed for suspending the weights. *m* represents the guides and *n, n*, the supporting flanges. In Fig. X the plan of the weights is shown, and in Fig. IX the broken lines *v* in each of the weights indicates the varying widths of the projection *t* on the respective weights, and the figure shows how, from number 7 to number 1 the weights are successively suspended one above the other. Fig. XII is a side view, enlarged, of a portion of the weights, flanges and guides. If the height of the lift is great, the disposition of the catching flanges *n* may be required to be such that they would come together near the bottom before the needed number was in place. Thus, there are five weights below number 7. To continue drawing the flanges *n* together below number 7 it is plain there would not be space enough to accommodate the catches for the five other weights. This difficulty is solved in this manner: the ends of the remaining weights are formed as in Fig. XI, in which the projection *r* corresponds in length to the projections *t* on the weights above. Back of this projection, which is to receive the guide, the weight is now made to conform in its projections *s* in width to those of *t* in the weights above. Broader flanges *n n*, Fig. XII, are used for these lower weights, and as many more weights may be thus provided for as there are above. In this figure it is plainly shown that the projections *r, s*, on the lower weight will readily pass the upper flanges *n*, while the parts *s* will be caught by the lower flanges *n n*.

The number of counterweights employed would vary with the height and magnitude of the bridge, and the spacing between them would be such as to most nearly equalize the strain on the holding member. Thus, referring to Fig. III, as the bridge begins its descent the strain increases rapidly at the start, and it will be observed that the weights will be picked up with corresponding rapidity, and as the strain becomes more generally distributed the weights are picked up at longer intervals. By careful calculations as to the divisions of the weights and their spacing, the strain on the lifting member and the motive power may be made nearly absolutely uniform throughout the lift.

Of course this principle is applicable to any size or form of counterweighted bridge, whether of iron, steel or timber, irrespective of the arrangement of the lifting members, sheaves, drums and means for manipulation as compared with those herein shown.

Having described my invention, what I claim, and desire to secure by Letters Patent, is—

1. The combination in an end lift bridge of the bridge *a*, tower A, lifting flexible member *c*, sheave *e*, drum *h* actuated by a motive power, sheave *d*, subdivided counterweight *f*, and catches *n* arranged substantially as described for supporting the subdivisions of the counterweight when detached, substantially as shown and described.

2. For the purposes herein described, a variable counterweight consisting of blocks or subdivisions having flanges or extensions *t, t*, on opposite ends or sides varying in width to adapt them to be caught by flanges arranged substantially in the manner shown in the well through which the weight moves.

3. A counterweight consisting of blocks or subdivisions substantially as described, said divisions being provided with elastic cushions substantially as and for the purposes set forth.

4. A counterweight substantially as and for the purpose described, in which the subdivisions are provided with elastic cushions *i* and leveling projections *k* substantially as shown.

5. An elastic cushion for a subdivided counterweight as described consisting of a metallic cap *i i* partly incasing the spring *i* and provided with a central stem, in combination with the blocks *f* provided with recesses to receive the incased spring, and holes in the recesses to loosely receive the stem of the casing, substantially as shown.

6. In combination with subdivided counterweights or blocks substantially as described, an upper series of blocks having projections adapted to short catching flanges, and a lower series of blocks adapted to pass the upper catches but to be caught by a lower series of long catches, substantially as shown and described.

GEORGE H. THOMSON.

Witnesses:
GEO. A. BUCKINGHAM,
H. ADLER.